(12) United States Patent
Yang et al.

(10) Patent No.: US 11,108,466 B2
(45) Date of Patent: Aug. 31, 2021

(54) ELECTRONIC EQUIPMENT

(71) Applicant: Beijing Xiaomi Mobile Software Co.,Ltd., Beijing (CN)

(72) Inventors: Yucong Yang, Beijing (CN); Yan Zheng, Beijing (CN); Gang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 31 days.

(21) Appl. No.: 16/022,458

(22) Filed: Jun. 28, 2018

(65) Prior Publication Data
US 2019/0097729 A1    Mar. 28, 2019

(30) Foreign Application Priority Data
Sep. 28, 2017    (CN) .......................... 201710901627.8

(51) Int. Cl.
*H04B 10/40*    (2013.01)
*G06F 1/16*    (2006.01)
(Continued)

(52) U.S. Cl.
CPC ............... *H04B 10/40* (2013.01); *G02B 6/43* (2013.01); *G06F 1/1613* (2013.01);
(Continued)

(58) Field of Classification Search
CPC ......... H04B 10/40; G02B 6/43; G06F 1/1613; G06F 1/1684; G06F 1/1686; H04M 1/026; H04M 1/0264; H04M 2250/12
See application file for complete search history.

(56) References Cited

U.S. PATENT DOCUMENTS

| 2010/0001980 A1* | 1/2010 | Kim ...................... G06F 1/1626 345/184 |
| 2010/0045621 A1* | 2/2010 | Kang .................... G06F 1/1626 345/173 |

(Continued)

FOREIGN PATENT DOCUMENTS

EP      2 493 156 A      8/2012

OTHER PUBLICATIONS

Extended search report dated Nov. 22, 2018 in European Patent Application No. 18176301.2.

*Primary Examiner* — James Wu
*Assistant Examiner* — Christopher L Augustin
(74) *Attorney, Agent, or Firm* — Oblon, McClelland, Maier & Neustadt, L.L.P.

(57) ABSTRACT

The present disclosure discloses an electronic equipment. The electronic equipment includes a transmission component, a reception component, and a functional component. The transmission component is configured to transmit signals of a specific type into a surrounding environment of the electronic equipment. The reception component is configured to receive signals of the specific type from the surrounding environment of the electronic equipment. The functional component is located between the transmission component and the reception component to reduce a size of the electronic equipment. Further, the transmission component and the reception component are located with a distance in a first direction. The transmission component, the functional component, and the reception component are arranged along the first direction.

12 Claims, 8 Drawing Sheets

(51) Int. Cl.
*G02B 6/43* (2006.01)
*H04M 1/02* (2006.01)

(52) U.S. Cl.
CPC ......... H04M 1/026 (2013.01); H04M 1/0264 (2013.01); *H04M 2250/12* (2013.01)

(56) References Cited

U.S. PATENT DOCUMENTS

| | | | |
|---|---|---|---|
| 2011/0304833 A1 | 12/2011 | Osaka et al. | |
| 2012/0050189 A1* | 3/2012 | Choboter | H04M 1/72577 345/173 |
| 2012/0289162 A1 | 11/2012 | Hosoi et al. | |
| 2013/0285951 A1* | 10/2013 | Jeon | G06F 3/0488 345/173 |
| 2014/0253477 A1* | 9/2014 | Shim | G06F 3/0416 345/173 |
| 2014/0311209 A1* | 10/2014 | Niederberger | G01K 15/007 73/1.06 |
| 2015/0065057 A1 | 3/2015 | Hosoi et al. | |
| 2015/0189178 A1* | 7/2015 | Lombardi | H04N 5/2258 348/207.99 |
| 2016/0065808 A1* | 3/2016 | Eromaki | H04N 5/2251 348/373 |
| 2016/0277555 A1* | 9/2016 | Lee | H04M 1/236 |
| 2016/0286296 A1 | 9/2016 | Hosoi et al. | |
| 2017/0091514 A1* | 3/2017 | Kang | G06K 9/00013 |
| 2017/0094222 A1* | 3/2017 | Tangeland | H04N 5/2252 |
| 2017/0119307 A1* | 5/2017 | Shim | H04M 1/72522 |
| 2017/0192599 A1* | 7/2017 | Jin | G06F 1/1626 |
| 2017/0194697 A1* | 7/2017 | Chang | H01Q 1/2291 |
| 2017/0265079 A1* | 9/2017 | Kim | H04L 63/0861 |
| 2018/0181979 A1* | 6/2018 | Frank | G06Q 30/0217 |
| 2018/0199127 A1 | 7/2018 | Hosoi et al. | |
| 2018/0241861 A1* | 8/2018 | Kim | G06F 1/1626 |
| 2018/0288201 A1* | 10/2018 | Lee | H04M 1/02 |

* cited by examiner

FIG. 1

(PRIOR ART)

FIG. 2

(PRIOR ART)

ELECTRONIC EQUIPMENT

CROSS-REFERENCE TO RELATED APPLICATIONS

This application is filed based upon and claims priority to Chinese Patent Application No. 201710901627.8, filed on Sep. 28, 2017, the entire contents of which are incorporated herein by reference.

TECHNICAL FIELD

The present disclosure relates to the technical field of terminal devices, and more particularly, to an electronic equipment.

BACKGROUND

In a related technology, along with enrichment of functions supported by electronic equipment, more and more functional modules and functional devices are assembled in the electronic equipment. Therefore, matching optimization is implemented on the functional modules, functional devices and the like in the electronic equipment to maintain or improve a user experience in the electronic equipment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an electronic equipment. The electronic equipment includes a transmission component, a reception component, and a functional component. The transmission component is configured to transmit signals of a specific type into a surrounding environment of the electronic equipment. The reception component is configured to receive signals of the specific type from the surrounding environment of the electronic equipment. The functional component is located between the transmission component and the reception component to reduce a size of the electronic equipment. Further, the transmission component and the reception component are located with a distance in a first direction. The transmission component, the functional component, and the reception component are arranged along the first direction.

According to an aspect of the disclosure, the distance between the transmission component and the reception component is predetermined to avoid interference between the received signals by the reception component and the transmitted signals by the transmission component.

According to an aspect of the disclosure, the transmission component is configured to transmit optical signals into the surrounding environment of the electronic equipment, and the reception component is configured to receive optical signals from the surrounding environment of the electronic equipment.

According an aspect of the disclosure, the first direction is along an edge of the electronic equipment.

According to an aspect of the disclosure, the transmission component, the reception component, and the functional component interact with the surrounding environment of the electronic equipment through a predetermined surface of the electronic equipment. The predetermined surface includes at least one of: a panel of the electronic equipment and a backplane of the electronic equipment.

According to an aspect of the disclosure, the functional component comprises one of: a camera component, a sound receiver, and a loudspeaker.

According to aspects of the disclosure, the transmission component, the functional component, and the reception component are located on a specific plane. When a cross-section of the functional component along the specific plane has a shape of a rectangle including a first side and a second side that is longer than the first side, the first side is parallel to the first direction.

According to aspects of the disclosure, the electronic equipment further comprises additional functional components located between the transmission component and the reception component. The transmission component, the functional component, the additional functional components, and the reception component are arranged along the first direction.

According to aspects of the disclosure, the electronic equipment further comprises additional functional components located between the transmission component and the reception component. The functional component and the additional functional components are arranged along a second direction that is perpendicular to the first direction and form a functional structure. The transmission component, the functional structure, and the reception component are sequentially arranged along the first direction.

According to an aspect of the disclosure, the electronic equipment further comprises a supporting structure. The transmission component, the functional component, and the reception component are positioned on the supporting structure.

Aspects of the disclosure provide a method of manufacturing an electronic equipment. The method includes disposing a transmission component configured to transmit signals of a specific type into a surrounding environment of the electronic equipment. The method also includes disposing a reception component configured to receive signals of the specific type from the surrounding environment of the electronic equipment. The transmission component and the reception component are located with a distance in a first direction. Further, the method includes disposing a functional component between the transmission component and the reception component to reduce a size of the electronic equipment. The transmission component, the functional component, and the reception component are arranged along the first direction.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Terms used in the application are intended not to limit the application but only to describe specific embodiments. "A", "said" and "the" used in a singular form in the application and the appended claims are also intended to include a plural form, unless other meanings are clearly represented in the context. It should also be understood that term "and/or" used in the present disclosure refers to and includes any or all possible combinations of one or more associated items which are listed.

It should be understood that, although terms first, second, third and the like may be adopted to describe various kinds of information in the application, the information should not be limited to these terms. These terms are only adopted to distinguish information of the same type. For example, without departing from the scope of the application, first information may also be called as second information, and similarly, second information may also be called as first information. It depends on the context. For example, word "if" used herein may be explained to be "while" or "when" or "in response to determination".

Figure 1:
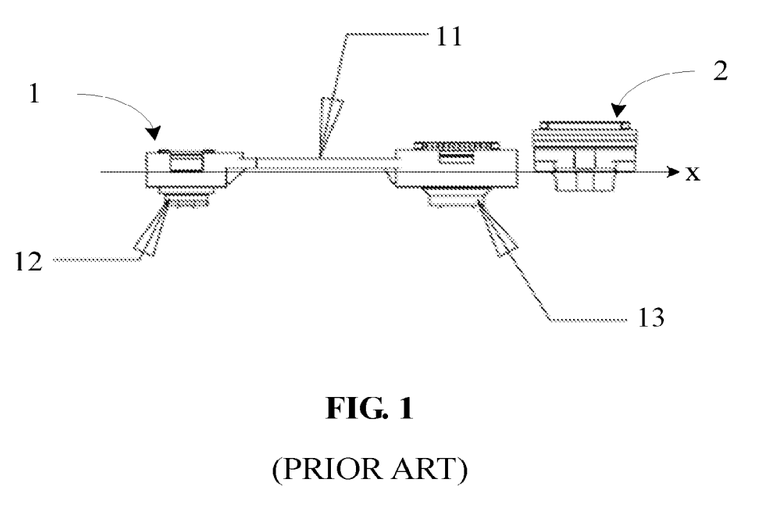
FIG. 1 is a top view of an assembly relationship between a signal transceiver component and a functional device, according to the related technology.
Figure 2:
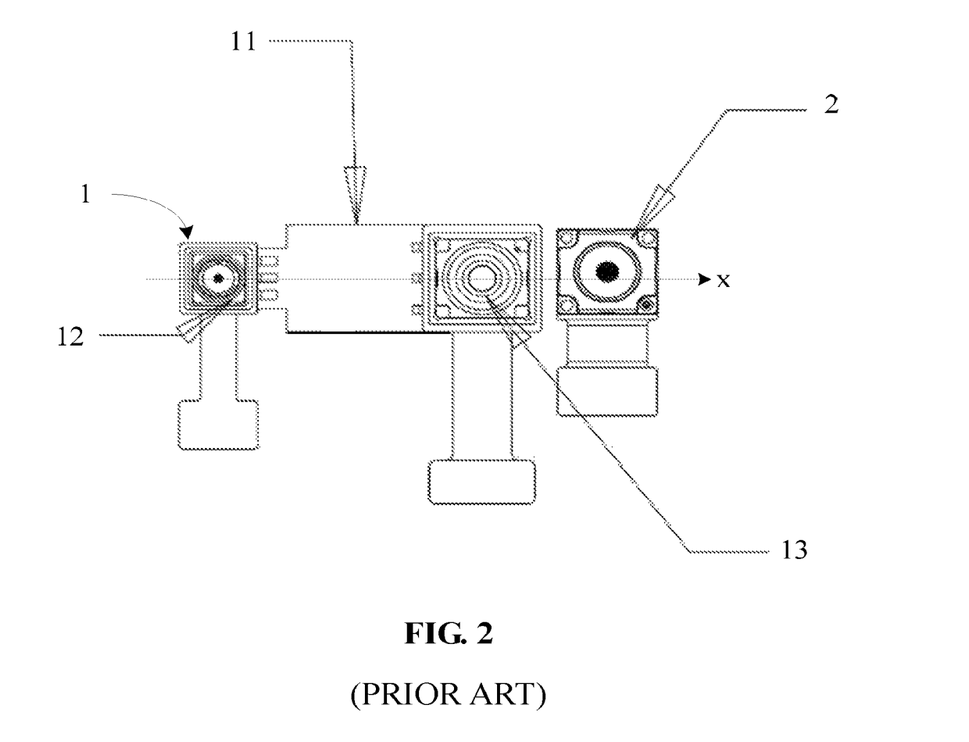
FIG. 2 is a front view corresponding to FIG. 1.

FIG. 1 is a top view of an assembly relationship between a signal transceiver signal and a functional device, according to the related technology. FIG. 2 is a front view corresponding to FIG. 1. As shown in FIGS. 1-2, the signal transceiver component 1 in the related technology includes a transmission portion 12 and a receiving portion 13, where the transmission portion 12 is configured to transmit a signal to the outside, and the receiving portion 13 is configured to receive a signal returned from the outside. The signal transceiver component 1 may further include a bracket 1, so that the transmission portion 12 and the receiving portion 13 may be arranged on the bracket 11.

However, since the signal transceiver component 1 and a functional device 2 are mutually independent and are sequentially arranged along an x-axis direction, a space occupied by the signal transceiver component 1 and the functional device 2 in the x-axis direction is not smaller than a sum of an occupied space 1 of the signal transceiver component 1 and an occupied space 2 of the functional device 2, and may further include a space occupied by a gap between the signal transceiver component 1 and the functional device 2.

Therefore, for solving the problem of space occupation in the related technology and optimizing an internal space of electronic equipment, the present disclosure discloses a targeted technical solution.

Figure 3:
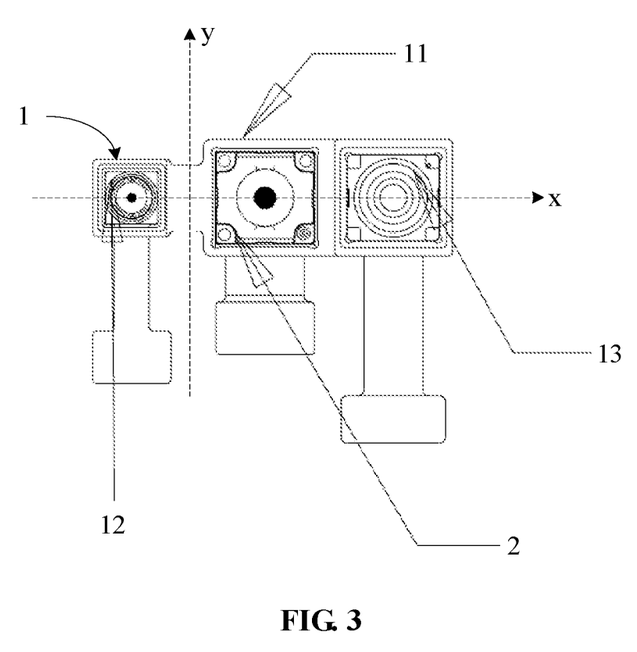
FIG. 3 is a schematic diagram illustrating an assembly relationship between a signal transceiver component and a functional device, according to an aspect of the disclosure.

FIG. 3 is a schematic diagram illustrating an assembly relationship between a signal transceiver component and a functional device, according to an exemplary embodiment. The signal transceiver component comprises a transmission component and a reception component. As shown in FIG. 3, in electronic equipment of the present disclosure, a functional device (for example, a functional component) 2 may be arranged between a transmission portion (for example, a transmission component) 12 and a receiving portion (for example, a reception component) 13 of a signal transceiver component 1, so that the transmission portion 12, the functional device 2 and the receiving portion 13 are sequentially arranged along an x axis. In an example, the signal transceiver component can be a physical component that transmits and receives any suitable signals, such as light signals, ultrasonic signals, and the like. In an example, the transmission portion 12 and the receiving portion 13 can be separated by a distance. For example, the distance can be predetermined to avoid interference between received signals by the receiving portion 13 and transmitted signals by the transmission portion 12. Comparison between FIG. 3 and FIGS. 1-2 corresponding to the related technology shows that: in the present disclosure, the functional device 2 is arranged between the transmission portion 12 and the receiving portion 13, and then the functional device 2 may fully utilize a gap space between the transmission portion 12 and the receiving portion 13 in an x-axis direction, so that an occupied space of the functional device 2 in the x-axis direction is included in an occupied space of the signal transceiver component 1 in the x-axis direction, therefore, additional space in the x-axis direction is not occupied by the functional device 2, and an occupied space formed by a gap between the functional device 2 and the signal transceiver component 1 in the x-axis direction may further be eliminated. Therefore, a size of the electronic equipment can be reduced by arranging the functional device 2 between the transmission portion 12 and the receiving portion 13.

From the abovementioned embodiment, it can be seen that: through the technical solution of the present disclosure, overall occupation of the signal transceiver component 1 and the functional device 2 to an internal space of the electronic equipment may be reduced, and reasonable optimization of the internal space of the electronic equipment is facilitated, so that a light and thin design of the electronic equipment is implemented.

Figure 4:
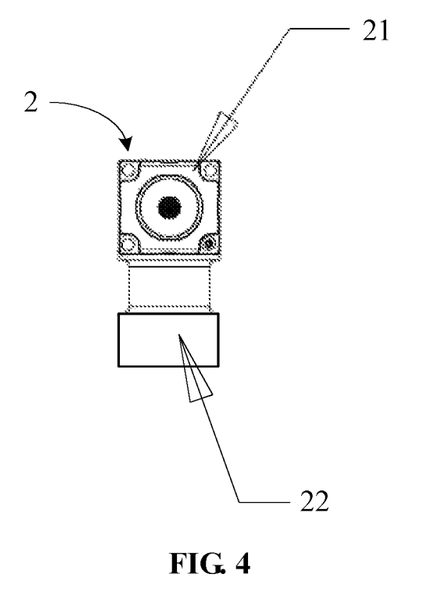
FIG. 4 is a schematic structural diagram of a functional device, according to an aspect of the disclosure.

In an embodiment, as shown in FIG. 3, the signal transceiver component 1 may include a bracket 11, and the transmission portion 12, the receiving portion 13 and the functional device 2 may be arranged on the bracket 11 respectively, so that the transmission portion 12, the functional device 2 and the receiving portion 13 are sequentially arranged along an x axis. Further, FIG. 4 is a structure diagram of a functional device, according to an exemplary embodiment. As shown in FIG. 4, the functional device 2 may include a device body 21 and a connecting wire 22, the device body 21 is configured to realize a function of the functional device 2, and the connecting wire 22 is configured to implement connection and data transmission. For example, the device body 21 is connected to a main board and the like of the electronic equipment through the connecting wire 22. The "functional device 2" described in the present disclosure usually refers to the device body 21. Similarly, the "transmission portion 12" and the "receiving portion 13" are body parts of the corresponding devices, and will not be elaborated one by one herein. Therefore, the above description that "the transmission portion 12, the functional device 2 and the receiving portion 13 are sequentially arranged along the x axis" may be understood as that the body part of the transmission portion 12, a body part of the functional device 2 (for example, the device body 21 shown in FIG. 4) and the body part of the receiving portion 13 are sequentially arranged along the x axis, and in the embodiment shown in FIG. 3, gravity centers of the body part of the transmission portion 12, the body part of the functional device 2 and the body part of the receiving portion 13 may substantially be located on the x axis, so that space occupied by the signal transceiver component 1 and the functional device 2 in a y-axis direction is favorably reduced, where the x axis is perpendicular to the y axis.

In an embodiment, the signal transceiver component 1 of the present disclosure may include a structured light module. For example, the transmission portion 12 shown in FIG. 3 may be a structured light transmission end of the structured light module, and the receiving portion 13 may be a structured light receiving end of the structured light module, therefore, corresponding structured light transmission and receiving functions are realized. In another embodiment, the signal transceiver component 1 of the present disclosure may further include a transceiver component for another signal. For example, the signal may include an infrared signal, a laser signal, an ultrasonic signal and the like, which will not be limited in the present disclosure.

Figure 5:
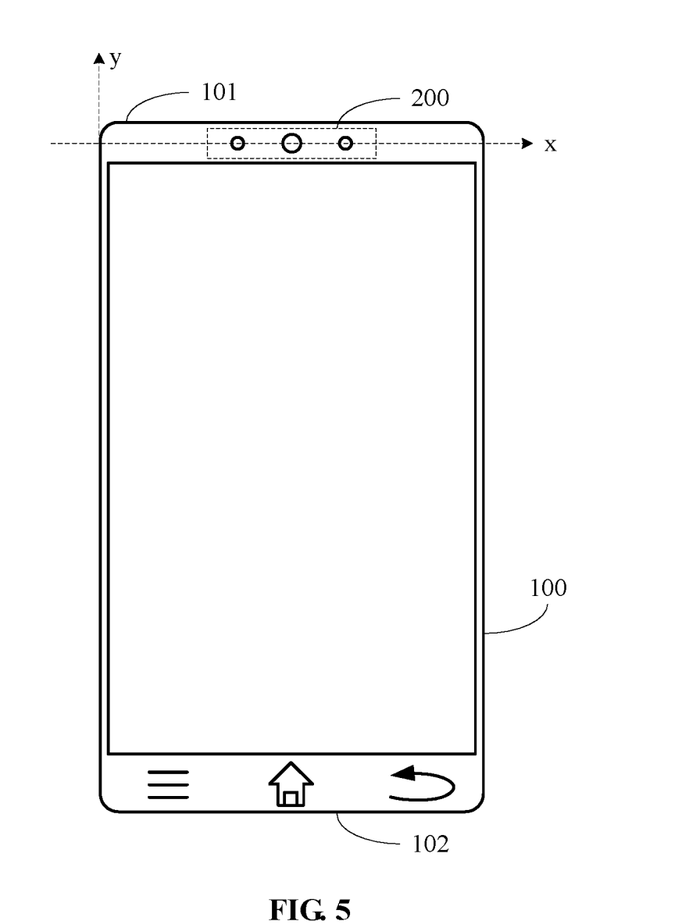
FIG. 5 is a schematic structural diagram of a panel direction of electronic equipment, according to an aspect of the disclosure.

In an embodiment, FIG. 5 is a structure diagram of electronic equipment in a panel direction, according to an exemplary embodiment. As shown in FIG. 5, the signal transceiver component 1 and the functional device 2 form an integrated structure 200. The integrated structure 200 may be located at a panel of the electronic equipment 100 to implement interaction with the outside of the electronic equipment 100 through the panel. Specifically, when a transmitted/received signal of the signal transceiver component 1 is a visible light signal, the transmission portion 12 of the signal transceiver component 1 transmits the visible light signal to the outside through an opening in the panel, and the receiving portion 13 of the signal transceiver component 1 receives a returned visible light signal from the outside through the opening in the panel.

In an embodiment, in case that the integrated structure 200 is located at the panel of the electronic equipment 100, the functional device 2 may include a front camera module, and the front camera module realizes a photographic function through the opening in the panel.

In an embodiment, in case that the transmission portion 12 and the receiving portion 13 of the signal transceiver component 1 and the functional device 2 are sequentially arranged along the x-axis direction, the x-axis direction may be an edge direction of the electronic equipment, for example, an extending direction of an upper edge 101 shown in FIG. 5, so that an occupied space of the integrated structure 200 in the y-axis direction is reduced as much as possible, and a larger space is reserved for a screen component of the electronic equipment 100 to achieve a higher screen-to-body ratio.

In an embodiment, the integrated structure 200 may be arranged at an edge of the electronic equipment 100, and for example, is located at the upper edge 101 shown in FIG. 5. In another embodiment, the integrated structure 200 may further be arranged at another edge of the electronic equipment 100, for example, a lower edge 102 shown in FIG. 5, or an edge on a left side, an edge on a right side and the like, which will not be limited in the present disclosure.

Figure 6:
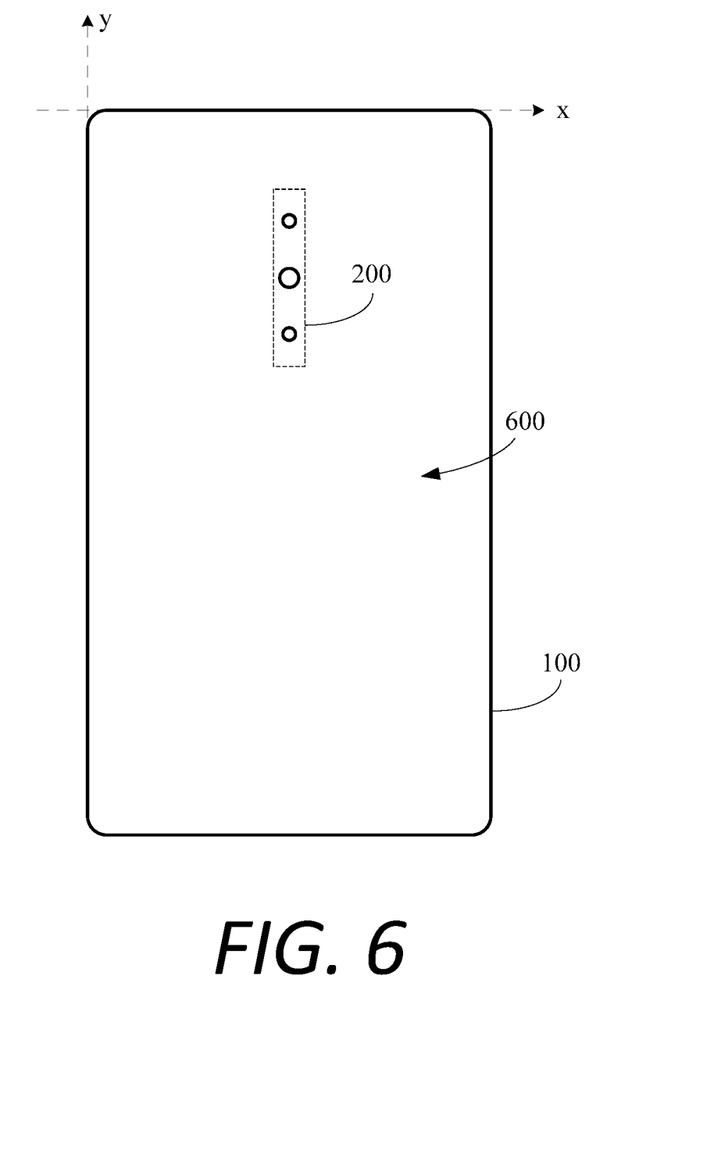
FIG. 6 is a schematic structural diagram of a back plate direction of electronic equipment, according to an aspect of the disclosure.

In an embodiment, FIG. 6 is a structure diagram of electronic equipment, in a back plate direction according to an exemplary embodiment. As shown in FIG. 6, the integrated structure 200 may be located at a back plate 600 of the electronic equipment 100, the functional device 2 may include a rear camera module, and the rear camera module realizes the photographic function through an opening in the back plate 600. Similar to the embodiment shown in FIG. 5, when a transmitted/received signal of the signal transceiver component 1 is a visible light signal, the transmission portion 12 of the signal transceiver component 1 transmits the visible light signal to the outside through the opening in the back plate 600, and the receiving portion 13 of the signal transceiver component 1 receives a returned visible light signal from the outside through the opening in the back plate 600. The transmission portion 12 and receiving portion 13 of the signal transceiver component 1 and the functional device 2 may be sequentially arranged along the edge direction of the electronic equipment 100, for example, are arranged along an extending direction of the edges of the left and right sides (the y-axis direction shown in FIG. 6), and in another embodiment, may further be arranged along another edge or another direction, which will not be limited in the present disclosure.

Figure 7:
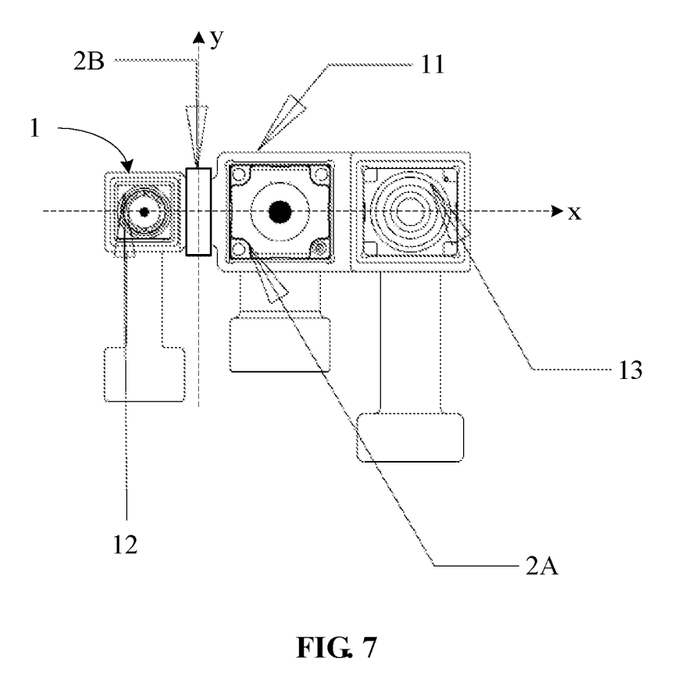
FIG. 7 is another schematic structural diagram illustrating an assembly relationship between a signal transceiver component and a functional device, according to an aspect of the disclosure.

FIG. 7 is another schematic diagram illustrating an assembly relationship between a signal transceiver component and a functional device, according to an exemplary embodiment. As shown in FIG. 7, the electronic equipment may include multiple functional devices such as a functional device 2A and a functional device 2B, and these functional devices may be sequentially arranged with the transmission portion 12 and receiving portion 13 of the signal transceiver component 1 along the x-axis direction, thereby further fully utilizing the gap space between the transmission portion 12 and the receiving portion 13 and reducing occupation of the multiple functional devices such as the functional device 2A and the functional device 2B to the internal space of the electronic equipment.

In an embodiment, in case that the signal transceiver component 1, the functional device 2A and the functional device 2B are located at the panel of the electronic equipment 100 shown in FIG. 5, the functional device 2A may be a front camera module of the electronic equipment, and the functional device 2B may be a receiver structure or loudspeaker structure of the electronic equipment. In another embodiment, when the signal transceiver component 1, the functional device 2A and the functional device 2B are located at the back plate 600 of the electronic equipment 100 shown in FIG. 6, the functional device 2A may be a rear camera module of the electronic equipment, and the functional device 2B may be a flashlight structure of the electronic equipment. Of course, there are no limits made in the present disclosure.

In an embodiment, in case that the transmission portion 12, the receiving portion 13, the functional device 2A, the functional device 2B and the like are located on a certain plane, assuming that a section of the functional device 2B along the plane is a rectangle as shown in FIG. 7, and a short-side direction of the section of the functional device 2B may be arranged to be parallel to the x-axis direction, that is, the functional device 2B is arranged in a manner shown in FIG. 7, so that excessive occupation of the functional device 2B to the gap space between the transmission portion 12 and the receiving portion 13 in the x-axis direction is avoided, and the gap space between the transmission portion 12 and the receiving portion 13 may be utilized more fully.

Figure 8:
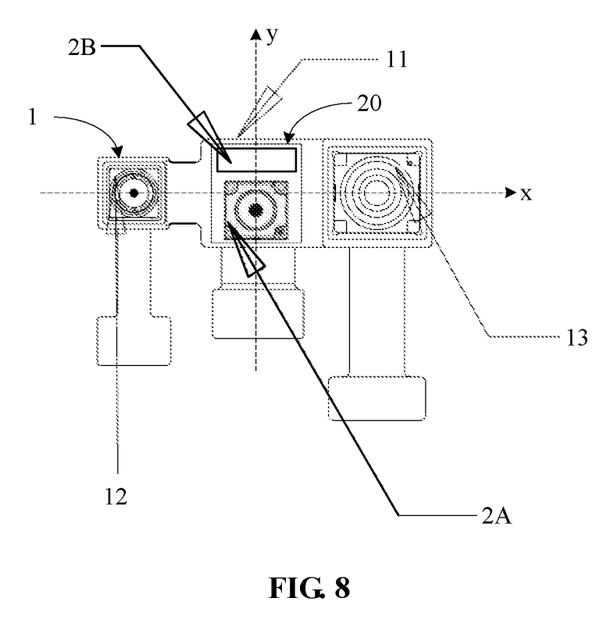
FIG. 8 is another schematic structural diagram illustrating an assembly relationship between a signal transceiver component and a functional device, according to an aspect of the disclosure.

In an embodiment, FIG. 8 is another schematic diagram illustrating an assembly relationship between a signal transceiver component and a functional device, according to an exemplary embodiment. As shown in FIG. 8, the functional device 2A and the functional device 2B may form a functional device combination 20, the functional device combination 20 as a whole is sequentially arranged with the transmission portion 12 and receiving portion 13 of the signal transceiver component 1 along the x-axis direction, for example, a gravity center of the functional device combination 20 is sequentially arranged with a gravity center of the transmission portion 12 and a gravity center of the receiving portion 13 on the x axis.

In an embodiment, the functional device 2A and the functional device 2B may be sequentially arranged along the y axis, and the y axis is perpendicular to the x axis. In case that the gap space between the transmission portion 12 and receiving portion 13 of the signal transceiver component 1 is relatively small and may not accommodate the functional device 2A and functional device 2B which are sequentially arranged along the x axis, in the embodiment shown in FIG. 8, it may be ensured that the functional device 2A and the functional device 2B are arranged between the transmission portion 12 and the receiving portion 13, thereby ensuring their space occupation in the x-axis direction.

In an embodiment, as shown in FIG. 8, in case that the transmission portion 12, the receiving portion, the functional device 2A, the functional device 2B and the like are located on a certain plane, assuming that a section of the functional device 2B along the plane is a rectangle shown in FIG. 8, a short-side direction of the section of the functional device 2B may be arranged to be parallel to the y-axis direction, that is, the functional device 2B is arranged in a manner shown in FIG. 8, so that excessive space occupation of the functional device combination 20 in the y-axis direction is avoided.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An electronic equipment, comprising:
   a transmission component configured to transmit signals of a specific type into a surrounding environment of the electronic equipment;
   a reception component configured to receive signals of the specific type from the surrounding environment of the electronic equipment, the transmission component and the reception component being located with a distance in a first direction, wherein the distance between the transmission component and the reception component is predetermined to avoid an interference between the received signals by the reception component and the transmitted signals by the transmission component;
   a functional component, located between the transmission component and the reception component to reduce a size of the electronic equipment, the transmission component, the functional component, and the reception component being arranged along the first direction; and
   a bracket between the transmission component and the reception component, wherein the transmission component is positioned on a first end of the bracket, the reception component is positioned on a second end of the bracket that is opposite to the first end of the bracket, and the functional component is positioned on the bracket between the transmission component and the reception component,
   wherein the transmission component, the reception component, and the functional component interact with the surrounding environment of the electronic equipment through a back plate of the electronic equipment,
   wherein the transmission component, the functional component, and the reception component are located on a specific plane, and
   wherein a cross-section of the functional component along the specific plane has a shape of a rectangle including a first side and a second side that is longer than the first side, and the first side is arranged to be parallel to the first direction.

2. The electronic equipment of claim 1, wherein:
   the transmission component is configured to transmit optical signals into the surrounding environment of the electronic equipment; and
   the reception component is configured to receive optical signals from the surrounding environment of the electronic equipment.

3. The electronic equipment of claim 1, wherein the first direction is along an edge of the electronic equipment.

4. The electronic equipment of claim 1, wherein the functional component comprises one of: a camera component, a sound receiver, and a loudspeaker.

5. The electronic equipment of claim 1, further comprising:
   additional functional components located between the transmission component and the reception component, wherein the transmission component, the functional component, the additional functional components, and the reception component are arranged along the first direction.

6. The electronic equipment of claim 1, further comprising:
   additional functional components located between the transmission component and the reception component, wherein the functional component and the additional functional components are arranged along a second direction that is perpendicular to the first direction and form a functional structure, the transmission component, the functional structure, and the reception component are sequentially arranged along the first direction.

7. A method of manufacturing an electronic equipment, comprising:
   disposing a transmission component configured to transmit signals of a specific type into a surrounding environment of the electronic equipment;
   disposing a reception component configured to receive signals of the specific type from the surrounding environment of the electronic equipment, the transmission component and the reception component being located with a distance in a first direction, wherein the distance between the transmission component and the reception component is predetermined to avoid an interference between the received signals by the reception component and the transmitted signals by the transmission component; and
   disposing a functional component between the transmission component and the reception component to reduce a size of the electronic equipment, the transmission component, the functional component, and the reception component being arranged along the first direction,
   wherein disposing the functional component between the transmission component and the reception component comprises:
      disposing the functional component between the transmission component and the reception component, the transmission component, the functional component, and the reception component being located on a specific plane; and
      wherein a cross section of the functional component along the specific plane has a shape of a rectangle including a first side and a second side that is longer than the first side, and the first side of the functional component is arranged to be parallel to the first direction,
   wherein the disposing the transmission component comprises disposing the transmission component on a first end of a bracket,
   wherein the disposing the reception component comprises disposing the reception component on a second end of the bracket that is opposite to the first end of the bracket, the transmission component and the reception component being separated by the distance along the first direction,
   wherein the disposing the functional component between the transmission component and the reception component comprises disposing the functional component on the bracket between the transmission component and the reception component, the transmission component, the functional component, and the reception component being sequentially arranged along the first direction, and
   wherein the disposing the functional component between the transmission component and the reception component comprises disposing the functional component between the transmission component and the reception component with respect to a predetermined surface of the electronic equipment, the predetermined surface including a back plate of the electronic equipment, the transmission component, the reception component, and the functional component interacting with the surrounding environment of the electronic equipment through the predetermined surface.

8. The method of claim 7, wherein
   the disposing the transmission component comprises disposing the transmission component configured to transmit optical signals into the surrounding environment of the electronic equipment; and
   the disposing the reception component comprises disposing the reception component configured to receive optical signals from the surrounding environment of the electronic equipment.

9. The method of claim 7, wherein the functional component including one of: a camera component, a sound receiver, and a loudspeaker.

10. The method of claim 7, further comprising:
    disposing additional functional components between the transmission component and the reception component, the transmission component, the functional component, the additional functional components, and the reception component being arranged along the first direction.

11. The method of claim 7, wherein the disposing the functional component between the transmission component and the reception component further comprises:
    disposing the functional component and additional functional components along a second direction that is perpendicular to the first direction, the functional component and the additional functional components forming a functional structure; and
    disposing the functional structure between the transmission component and the reception component, the transmission component, the functional structure, and the reception component being sequentially arranged along the first direction.

12. The method of claim 7, wherein the first direction is along an edge of the electronic equipment.

* * * * *